(12) United States Patent
Castaneda et al.

(10) Patent No.: US 10,917,861 B2
(45) Date of Patent: Feb. 9, 2021

(54) RADIO DEVICE AND RADIO CELL WITH MULTIPLEXED DATA SEQUENCES WITH UNEQUAL POWER ALLOCATION

(71) Applicant: Huawei Technologies Duesseldorf GmbH, Munich (DE)

(72) Inventors: Mario Castaneda, Munich (DE); Nikola Vucic, Munich (DE); Jian Luo, Munich (DE)

(73) Assignee: Huawei Technologies Duesseldorf GmbH, Duesseldorf (DE)

( * ) Notice: Subject to any disclaimer, the term of this patent is extended or adjusted under 35 U.S.C. 154(b) by 0 days.

(21) Appl. No.: 16/414,460

(22) Filed: May 16, 2019

(65) Prior Publication Data
US 2019/0274104 A1 Sep. 5, 2019

Related U.S. Application Data (63) Continuation of application No. PCT/EP2016/077882, filed on Nov. 16, 2016.

(51) Int. Cl.
*H04W 52/32* (2009.01)
*H04L 5/00* (2006.01)
(Continued)

(52) U.S. Cl.
CPC ......... *H04W 52/325* (2013.01); *H04L 5/0048* (2013.01); *H04L 5/0051* (2013.01);
(Continued)

(58) Field of Classification Search
None
See application file for complete search history.

(56) References Cited

U.S. PATENT DOCUMENTS

| 6,909,881 B2* | 6/2005 | Uehara | ................. H04L 1/0009 |
| | | | 455/522 |
| 7,983,230 B1* | 7/2011 | Li | ...................... H04W 52/267 |
| | | | 370/338 |

(Continued)

FOREIGN PATENT DOCUMENTS

| CN | 101500242 A | 8/2009 |
| CN | 105790913 A | 7/2016 |

OTHER PUBLICATIONS

Fernandes et al., "Inter-Cell Interference in Noncooperative TDD Large Scale Antenna Systems," IEEE Journal on Selected Areas in Communications, vol. 31, No. 2, pp. 192-201, XP11488287A, Institute of Electrical and Electronics Engineers—New York, New York (Feb. 2013).

(Continued)

*Primary Examiner* — Andrew C Oh
(74) *Attorney, Agent, or Firm* — Leydig, Voit & Mayer, Ltd.

(57) ABSTRACT

The disclosure relates to a radio device, in particular a user equipment, for communication with a radio cell, the radio device comprising: a processor, configured: to generate a radio frame comprising a first data sequence and a second data sequence, to arrange the first data sequence within the radio frame in a time interval that is non-overlapping with respect to a predetermined time interval of a first data sequence of another radio device with another adjacent radio cell, and to apply an unequal power allocation for generating the first data sequence and the second data sequence.

8 Claims, 9 Drawing Sheets

(51) Int. Cl.
*H04L 5/14* (2006.01)
*H04W 52/24* (2009.01)
*H04W 52/34* (2009.01)
*H04W 52/14* (2009.01)

(52) U.S. Cl.
CPC .............. *H04L 5/0073* (2013.01); *H04L 5/14* (2013.01); *H04W 52/241* (2013.01); *H04W 52/243* (2013.01); *H04W 52/346* (2013.01); *H04L 5/0007* (2013.01); *H04W 52/146* (2013.01)

(56) References Cited

U.S. PATENT DOCUMENTS

| | | | | |
|---|---|---|---|---|
| 9,088,392 | B2* | 7/2015 | Obuchi | H04B 17/24 |
| 2002/0115464 | A1* | 8/2002 | Hwang | H04W 52/54 |
| | | | | 455/522 |
| 2004/0131007 | A1* | 7/2004 | Smee | H04L 1/0071 |
| | | | | 370/208 |
| 2005/0157806 | A1* | 7/2005 | Walton | H04L 25/03866 |
| | | | | 375/267 |
| 2005/0201280 | A1* | 9/2005 | Lundby | H04L 1/0002 |
| | | | | 370/229 |
| 2005/0272456 | A1* | 12/2005 | Yoshii | H04W 52/04 |
| | | | | 455/522 |
| 2006/0240826 | A1* | 10/2006 | Shinozaki | H04L 1/0057 |
| | | | | 455/436 |
| 2006/0251156 | A1* | 11/2006 | Grant | H04W 52/42 |
| | | | | 375/148 |
| 2007/0053282 | A1* | 3/2007 | Tong | H04L 5/0023 |
| | | | | 370/208 |
| 2009/0305693 | A1* | 12/2009 | Shimomura | H04W 74/004 |
| | | | | 455/422.1 |
| 2010/0296459 | A1* | 11/2010 | Miki | H04L 5/0007 |
| | | | | 370/329 |
| 2012/0093108 | A1* | 4/2012 | Wengerter | H04W 52/262 |
| | | | | 370/329 |
| 2012/0216092 | A1* | 8/2012 | Lee | H04L 1/0625 |
| | | | | 714/748 |
| 2012/0320869 | A1* | 12/2012 | Stadelmeier | H04L 27/2601 |
| | | | | 370/329 |
| 2013/0003690 | A1* | 1/2013 | Kim | H04W 52/146 |
| | | | | 370/329 |
| 2013/0039205 | A1* | 2/2013 | Murakami | H04B 17/345 |
| | | | | 370/252 |
| 2013/0077571 | A1 | 3/2013 | Papasakellariou et al. | |
| 2013/0230010 | A1* | 9/2013 | Kim | H04W 52/16 |
| | | | | 370/329 |
| 2013/0322333 | A1* | 12/2013 | Tsai | H04W 4/00 |
| | | | | 370/328 |
| 2014/0024388 | A1* | 1/2014 | Earnshaw | H04L 5/0073 |
| | | | | 455/452.2 |
| 2014/0135049 | A1* | 5/2014 | Hirata | H04L 1/0026 |
| | | | | 455/501 |
| 2014/0362732 | A1* | 12/2014 | Landstrom | H04W 24/02 |
| | | | | 370/254 |
| 2014/0376464 | A1* | 12/2014 | Nam | H04J 11/005 |
| | | | | 370/329 |
| 2015/0131580 | A1* | 5/2015 | Liu | H04L 25/0204 |
| | | | | 370/329 |
| 2015/0139111 | A1* | 5/2015 | Fodor | H04W 52/12 |
| | | | | 370/329 |
| 2016/0020890 | A1* | 1/2016 | Sirotkin | H04L 65/4092 |
| | | | | 370/352 |
| 2016/0183195 | A1* | 6/2016 | Gao | H04W 52/325 |
| | | | | 455/522 |
| 2016/0262129 | A1* | 9/2016 | Better | H04W 68/08 |
| 2016/0270005 | A1* | 9/2016 | Li | H04W 72/1278 |
| 2016/0285604 | A1* | 9/2016 | Larsson | H04L 5/0035 |
| 2016/0286012 | A1* | 9/2016 | Yu | H04L 25/03343 |
| 2018/0183506 | A1* | 6/2018 | Hessler | H04B 7/06 |
| 2019/0296942 | A1* | 9/2019 | Bengtsson | H04B 7/0421 |

OTHER PUBLICATIONS

"3rd Generation Partnership Project; Technical Specification Group Radio Access Network;Evolved Universal Terrestrial Radio Access (E-UTRA); Physical layer procedures (Release 14)," 3GPP TS 36.213 V14.0.0, pp. 1-406, XP51172655A, 3rd Generation Partnership Project—Valbonne, France (Sep. 2016).

Elijah et al., "A Comprehensive Survey of Pilot Contamination in Massive MIMO-5G System," IEEE Communications Surveys and Tutorials, vol. 18, No. 2, Second Quarter 2016, pp. 905-923. XP11611158A, Institute of Electrical and Electronics Engineers—New York, New York (2016).

Guo et al., "Uplink Power Control with MMSE Receiver in Multi-Cell MU-Massive-MIMO Systems," IEEE ICC 2014—Wireless Communications Symposium, XP032632350, pp. 5184-5190, Institue of Electrical and Electronics Engineers, New York, New York (2014).

* cited by examiner

RADIO DEVICE AND RADIO CELL WITH MULTIPLEXED DATA SEQUENCES WITH UNEQUAL POWER ALLOCATION

CROSS-REFERENCE TO RELATED APPLICATIONS

This application is a continuation of International Application No. PCT/EP2016/077882, filed on Nov. 16, 2016, the disclosure of which is hereby incorporated by reference in its entirety.

TECHNICAL FIELD

The present embodiments of the disclosure relates to a radio device, in particular a user equipment, and a radio cell, in particular a base station, processing a radio frame with a first and a second data sequence, in particular a pilot sequence and an uplink data sequence, which are arranged in a specific time interval in the radio frame. The application particularly relates to time-shifted pilots multiplexed with uplink data.

BACKGROUND

Figure 1:
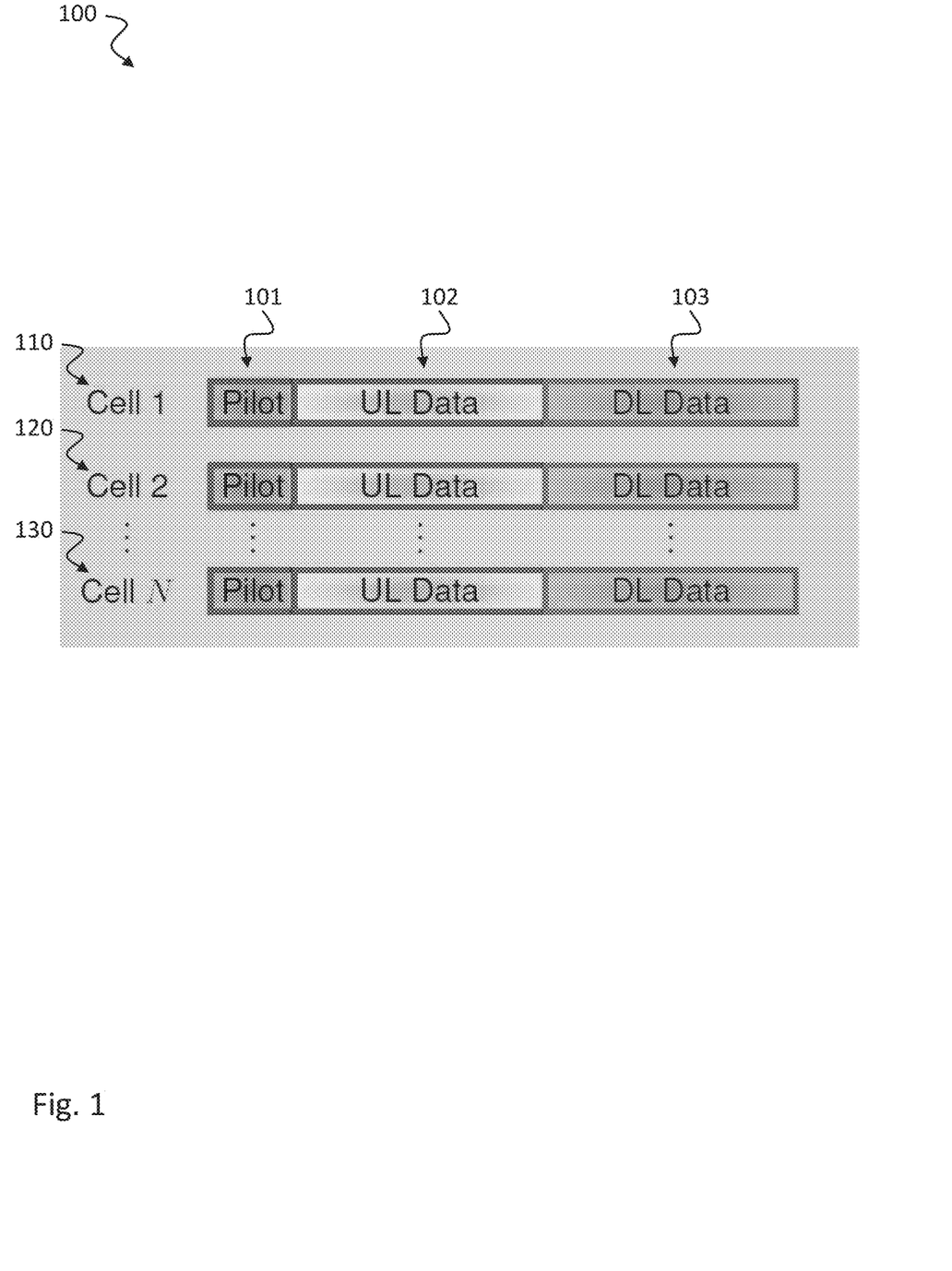
FIG. 1 shows a schematic diagram 100 illustrating time-aligned (synchronous) pilots sequences among neighboring radio cells.

To meet the demands of higher data rates, massive multiple-input multiple-output (MIMO) has been considered for future wireless communication networks. A time division duplex (TDD) system is usually assumed in massive MIMO systems 100 as shown in FIG. 1 with a pilot/training phase in the uplink where the users send orthogonal pilot sequences 101 to the base station (BS), thus enabling the BS to estimate the channel to the users in its cell 110. By exploiting channel reciprocity, the estimated channels are employed for receive and transmit beamforming in the uplink (UL) 102 and downlink (DL) 103, respectively. Due to limited resources, the same orthogonal pilot sequences 101 (or subspace) are reused in neighboring cells 120, 130. Since the pilot phases 101 in adjacent cells 120, 130 are usually time-aligned as shown in FIG. 1, when a BS estimates the channel to its users, it actually estimates the channels (interfering channels) to the users in neighboring cells 120, 130 employing the same pilot sequences 101, resulting in pilot contamination. Thus when performing transmit (or receive) beamforming based on the channel estimates, some energy is spilled onto (or received from) the interfering channels. Since this intercell interference does not vanish with increasing number of antennas, pilot contamination has been identified as a limiting factor for massive MIMO systems. FDD systems are also considered for massive MIMO. In this case, pilot contamination is still present in the uplink of a massive MIMO FDD system.

SUMMARY

It is an object of some of the present embodiments of invention to improve a radio communication, in particular to provide a concept for mitigating the effect of pilot contamination in TDD and FDD systems, in particular for use in mobile communication systems such as LTE or future 5G communication systems.

This object is achieved by the features of the independent claims. Further implementation forms are apparent from the dependent claims, the description and the figures.

A basic idea of the present embodiments of invention is to introduce a new scheme for mitigating pilot contamination. This new scheme includes the following items: Shifting the uplink pilots in time with respect to neighboring cells and multiplexing them with uplink data, such that pilot transmission in each cell are not interfered by the pilot transmission in neighboring cells but by the UL data transmission in the adjacent cells; and, in addition by employing an unequal (e.g. optimum) power allocation between the pilot and UL data transmission.

Although it is usually assumed that pilot contamination arises due to the reuse of pilot sequences in neighboring cells, it actually results from simultaneous UL transmissions in neighbouring or adjacent cells, regardless whether they are pilots or data. Thus simply shifting the pilots will not mitigate the pilot contamination with an equal power allocation between the pilot and data transmission. The proposed concept exploits however the tradeoff introduced by unequal power allocation between the pilot phase and the UL data transmission phase given an average power constraint at the users. When using time-shifted pilots among adjacent cells along with an unequal (optimum) power allocation between the pilot and UL data transmission, pilot contamination can indeed be mitigated.

Note that neighboring or adjacent cells do not necessarily mean that they have the same border or are physically next to each other; it rather means that neighboring or adjacent cells can suffer from interference caused by each other. Adjacent cells are referred to being cells 110, 120, 130 as depicted in FIG. 1 for which the common TDD or FDD system 100 applies the same pilot sequence 101.

The radio devices and radio cells described herein may be implemented in wireless communication networks, in particular communication networks based on mobile communication standards such as LTE and 4G or future 5G communication systems. The radio devices and radio cells described herein may further be implemented in a base station (e.g. NodeB, eNodeB, Access Point) or a mobile device (or mobile station or User Equipment (UE)). The described devices may include integrated circuits and/or passives and may be manufactured according to various technologies.

The radio devices and radio cells described herein may be configured to transmit and/or receive radio signals. Radio signals may be or may include radio frequency signals radiated by a radio transmitting device (or radio transmitter or sender). The frequency range may correspond to frequencies of alternating current electrical signals used to produce and detect radio waves.

The radio devices and radio cells described herein may be designed in accordance to mobile communication standards such as e.g. the Long Term Evolution (LTE)/4G standard or the advanced version LTE-A thereof and future standards of 5G communication systems. The radio devices and radio cells described herein may be applied in OFDM systems.

In order to describe the embodiments of the invention in detail, the following terms, abbreviations and notations will be used:

BS: Base Station, eNodeB, eNB
UE: User Equipment, e.g. a mobile device or any future device e.g. machine type communication Device
MIMO: multiple-input multiple-output (MIMO)
TDD: time division duplex
FDD: frequency division duplex
UL: uplink
DL: downlink
4G: $4^{th}$ generation of wireless mobile telecommunications technology according to 3GPP standardization
5G: $5^{th}$ generation of wireless mobile telecommunications technology according to 3GPP standardization LTE: Long Term Evolution
OFDM: Orthogonal Frequency Division Multiplex
RF: Radio Frequency
SINR: signal-to-interference and noise ratio According to a first aspect, the present embodiments of the invention relates to a radio device, in particular a user equipment, for communication with a radio cell, the radio device comprising: a processor, configured: to generate a radio frame comprising a first data sequence and a second data sequence, to arrange the first data sequence within the radio frame in a time interval that is non-overlapping with respect to a predetermined time interval of a first data sequence of another radio device in another adjacent radio cell, and to apply an unequal power allocation for generating the first data sequence and the second data sequence.

By arranging the first data sequence within this specific time interval(s) within the radio frame and applying said unequal power allocation for the first and second data sequence, the effect of pilot contamination in TDD and FDD systems can be mitigated as can be seen from FIGS. 5 to 7 described below.

This provides the further advantage that by using a plurality of such radio devices in a radio communication system the intercell interference, e.g. pilot contamination, can be mitigated not only for the radio devices in a given cell, but actually for all the radio devices in all the cells, as long as they have the time-shifted pilots with unequal power allocation as described herein.

In a first possible implementation form of the radio device according to the first aspect, the first data sequence of the radio device and the first data sequence of the other radio device comprise pilot sequences, in particular orthogonal pilot sequences. This provides the advantage that the above described problem of pilot contamination can be suppressed.

In a second possible implementation form of the radio device according to the first aspect as such or according to the first implementation form of the first aspect, the second data sequence is based on uplink data, and the radio frame further comprises a third data sequence based on downlink data. Such a radio device is usually implemented as an uplink device (base station).

This provides the advantage that intercell interference resulting from pilot contamination in such radio frames including pilot data as well as uplink and downlink data can be suppressed or at least mitigated.

In a third possible implementation form of the radio device according to the second implementation form of the first aspect, the radio frame comprises a first phase comprising the first data sequence and the second data sequence and a second phase comprising the third data sequence, and the first data sequence of the radio device is time-shifted with respect to the first data sequence of the other radio device in the first phase of the radio frame. Such a radio device is usually implemented as an uplink device (base station).

This provides the advantage that intercell interference resulting from pilot contamination in such radio frames in which the pilot sequences are time shifted with the uplink sequences can be suppressed or at least mitigated. Note that the downlink sequences can be time-aligned with respect to each other.

In a fourth possible implementation form of the radio device according to the first aspect as such or according to any of the preceding implementation forms of the first aspect, the processor is configured to apply the unequal power allocation based on an average signal-to-interference and noise ratio (SINR) of the radio devices.

This provides the advantage that the intercell interference mitigation can be adjusted based on the (uplink) channel quality of the radio devices.

In a fifth possible implementation form of the radio device according to the first aspect as such or according to any of the preceding implementation forms of the first aspect, the processor is configured to apply the unequal power allocation based on a control signal received from the radio cell, the control signal notifying a power allocation update.

This provides the advantage that the intercell interference mitigation can be controlled by the base station.

In a sixth possible implementation form of the radio device according to the first aspect as such or according to any of the preceding implementation forms of the first aspect, the processor is configured to adjust a power for generating the first data sequence and/or a power for generating the second data sequence with respect to an overall transmission power constraint.

In a seventh possible implementation form of the radio device according to the sixth implementation form of the first aspect, the processor is configured to adjust the power (or energy) $P_T T_P$ for generating the first data sequence with respect to the power (or energy) $P_D N T_P$ for generating the second data sequence according to the overall transmission power (or energy) constraint $P(N+1)T_P$, where $P_T$ is the power (or energy) for transmission of one symbol of the first data sequence, $P_D$ is the power (or energy) for transmission of one symbol of the second data sequence, $T_P$ is the number of symbols of the first data sequence, N is the number of adjacent radio cells and P is the average transmit power (or energy) for the radio device.

This provides the advantage that transmission power for the first and second data sequence of the radio device can be optimally adjusted.

In an eighth possible implementation form of the radio device according to any of the sixth or seventh implementation forms of the first aspect, the processor is configured to adjust the power (or energy) for generating the first data sequence and/or the power (or energy) for generating the second data sequence according to a performance metric.

This provides the advantage that transmission power for the first and second data sequence of the radio device can be optimally adjusted by using the performance metric.

In a ninth possible implementation form of the radio device according to the eighth implementation form of the first aspect, the performance metric for generating a frequency division duplex (FDD) radio frame is based on an optimality criterion with respect to an uplink transmission, and the performance metric for generating a time division duplex (TDD) radio frame is based on an optimality criterion with respect to an uplink transmission and/or a downlink transmission.

This provides the advantage that transmission power and intercell interference can be optimally adjusted for both, FDD and TDD communication. Note that transmission power refers to transmission power for the first and second data sequence of the radio device.

In a tenth possible implementation form of the radio device according to any of the eighth or ninth implementation forms of the first aspect, the performance metric depends on at least one of the following system parameters: a number of adjacent radio cells, a length of the first data sequence, a transmit power of the radio frame, a number of other radio devices communicating with the radio cell, a channel quality of the other radio devices.

This provides the advantage that transmission power and intercell interference can be flexibly adjusted by considering some or all of the above system parameters.

According to a second aspect, the present embodiments of the invention relates to a radio cell, in particular a base station for communication with a radio device, the radio cell comprising: a processor, configured to receive a radio frame from the radio device, wherein the radio frame comprises a first data sequence and a second data sequence, wherein the first data sequence is arranged within the radio frame in a time interval that is non-overlapping with respect to a predetermined time interval of a first data sequence of another radio device in another adjacent radio cell, and wherein the first data sequence and the second data sequence have an unequal power allocation.

By receiving a radio frame in which the first data sequence is arranged within this specific time interval(s) and said unequal power allocation for the first and second data sequence is applied, the effect of intercell interference, e.g. pilot contamination, in TDD and FDD systems can be mitigated as can be seen from FIGS. 5 to 7 described below.

This provides the further advantage that by using a plurality of such radio cells in a radio communication system the intercell interference, e.g. pilot contamination, can be mitigated not only for the radio devices in a given cell, but actually for all the radio devices in all the cells, as long as they have the time-shifted pilots with unequal power allocation as described herein.

In a first possible implementation form of the radio cell according to the second aspect, the processor is configured to generate a control signal for transmission to the radio devices, the control signal indicating an adjustment for the power allocation of the first data sequence and the second data sequence of each radio device.

This provides the advantage that the intercell interference mitigation can be controlled by the base station.

In a second possible implementation form of the radio cell according to the first implementation form of the second aspect, the processor is configured to generate the control signal based on a signal-to-noise and interference ratio (SINR) of the radio devices.

This provides the advantage that the intercell interference mitigation can be adjusted based on the (uplink) channel quality of the radio devices.

In a third possible implementation form of the radio cell according to any of the first or second implementation forms of the second aspect, the processor is configured to generate the control signal based on feedback from other radio devices communicating with the radio cell and/or feedback from other radio cells of a plurality of adjacent radio cells.

This provides the advantage that the effect of pilot contamination in TDD and FDD systems can be more efficiently mitigated when using more information from other radio devices and other radio cells.

According to a third aspect, the present embodiments of the invention relates to a radio communication system, comprising a plurality of radio devices for communication with a plurality of radio cells, wherein a first radio device for communication with a first radio cell comprises: a processor, configured: to generate a radio frame comprising a first data sequence and a second data sequence, to arrange the first data sequence within the radio frame in a time interval that is non-overlapping with respect to a predetermined time interval of a first data sequence of a second radio device for communication with a second radio cell that is adjacent to the first radio cell, and to apply an unequal power allocation for generating the first data sequence and the second data sequence.

By arranging the first data sequence within this specific time interval(s) within the radio frame and applying said unequal power allocation for the first and second data sequence, the effect of intercell interference, e.g. pilot contamination, in TDD and FDD systems can be mitigated.

In a first possible implementation form of the radio communication system according to the third aspect, the second radio device for communication with the second radio cell comprises: a processor, configured: to generate a radio frame comprising a first data sequence and a second data sequence, to arrange the first data sequence within the radio frame in a time interval that is non-overlapping with respect to a predetermined time interval of the first data sequence of the first radio device, and to apply an unequal power allocation for generating the first data sequence and the second data sequence.

This provides the advantage that such a radio communication system mitigates the intercell interference, e.g. pilot contamination, not only for the radio devices in a given cell, but actually for all the radio devices in all the cells, as long as they have the time-shifted pilots with unequal power allocation as described herein.

BRIEF DESCRIPTION OF THE DRAWINGS

Further embodiments of the invention will be described with respect to the following figures, in which.

DETAILED DESCRIPTION OF EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 2:
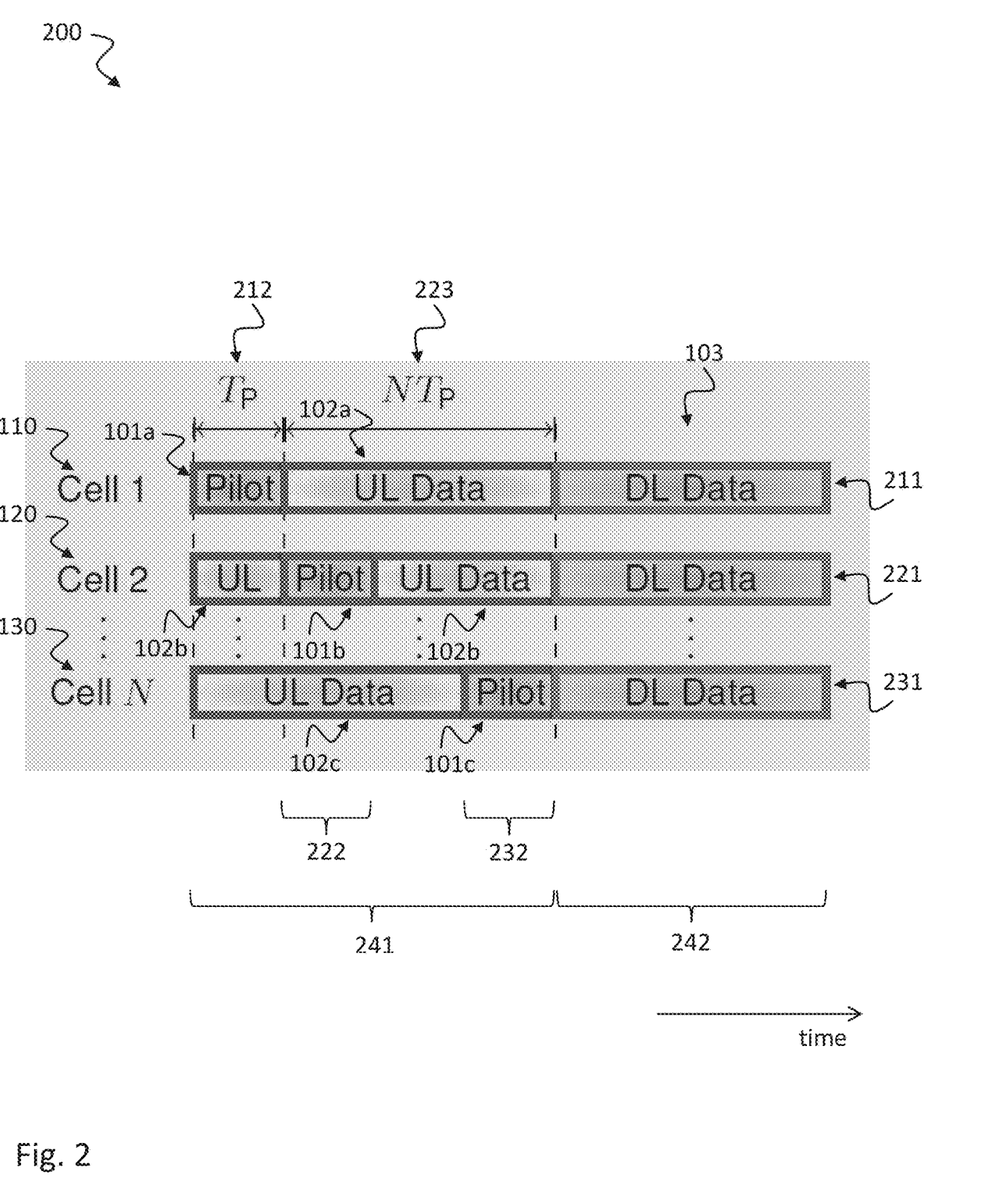
FIG. 2 shows a schematic diagram 200 illustrating time-shifted (asynchronous/orthogonal) pilots among neighboring radio cells according to an implementation form.

FIG. 2 shows a schematic diagram 200 illustrating time-shifted (asynchronous/orthogonal) pilots among neighboring radio cells according to an implementation form. In contrast to the synchronous pilots 101 shown in FIG. 1, the concept according to the disclosure is that pilots 101a, 101b, 101c in adjacent cells 110, 120, 130 are shifted in time and are multiplexed with the UL data transmission 102a, 102b, 102c as shown in FIG. 2. The pilots 101a, 101b, 101c are shifted such that the pilots 101a, 101b, 101c in adjacent cells 110, 120, 130 do not overlap. This shift or offset may also be applied with respect to frequency. Pilot contamination, nonetheless, will not be fully mitigated by merely shifting the pilots 101a, 101b, 101c. Although it is assumed that pilot contamination arises due to the reuse of pilot sequences in neighboring cells, pilot contamination results actually from UL intercell interference on the training phase/channel estimation, be it from pilot transmission 101a, 101b, 101c or UL data transmission 102a, 102b, 102c in adjacent cells 110, 120, 130. If all users transmit the UL pilots 101a, 101b, 101c with a different power than the transmit power employed for their UL data transmission 102a, 102b, 102c, however, pilot contamination can indeed be reduced.

FIG. 2 exemplary shows the case of N adjacent cells 110, 120, 130. However, any other number of adjacent radio cells can exist, e.g. only two adjacent radio cells, or 3, 4, 5, 6, 7, 8, 9, 10, 11, 12, 13, 14, 15, etc. adjacent radio cells. Besides, any number of radio devices can exist in any radio cell and in any adjacent radio cell.

Note that the concept shown in FIG. 2 can be generalized to other sequences which are not limited to pilot or uplink or downlink data sequences. In particular, the pilot sequences 101a, 101b, 101c depicted in FIG. 2 can be any first sequences 101a, 101b, 101c; the UL data sequences 102a, 102b, 102c depicted in FIG. 2 can be any second sequences 102a, 102b, 102c and the DL data sequences 103 depicted in FIG. 2 can be any third sequences 103 as further described below with respect to FIGS. 3 and 4.

To dwell further on the power allocation between the pilot and the UL data transmission, denote the average power for all users as P. With the time-aligned pilots 101 from FIG. 1, each user transmits its pilot 101 and uplink 102 data with the same power P. For the concept disclosed herein, denote the power at each user for the pilot transmission as $P_T$, whereas the power for the UL data transmission is denoted as $P_D$. Given a pilot length equal to $T_P$ symbols and N adjacent cells, N pilot shifts are needed to have non-overlapping pilot transmissions among the N neighboring cells 110, 120, 130 as shown in FIG. 2. In this case, the energy available for the pilot transmission phase is $P_T T_P$, while the energy available for the UL data transmission is $P_D N T_P$. To satisfy the average UL power constraint over one frame the following relations are required:

$$P_T T_P + P_D N T_P = P(N+1)T_P$$

$$P_T + P_D N = P(N+1).$$

Changing the power allocation between the pilot phase and UL data transmission results in a tradeoff as discussed next. First, denote the fraction of energy η dedicated for the pilot phase as:

$$\eta = \frac{P_T T_P}{P(N+1)T_P} = \frac{P_T}{P(N+1)}.$$

By varying η from 0 to 1, the power allocation can be changed between the pilot and the UL data transmission phase for all users in all cells as follows: For η→0: more power $P_D$ is allocated for the data transmission (tx) in all cells; For η→1: more power $P_T$ is allocated for the training in all cells.

On the one hand, a large $P_T$ (η→1) leads to better channel estimation due to more pilot power and smaller $P_D$, which results in less intercell interference (pilot contamination) on the pilot phase from the UL data transmission in other cells. However, better channel estimation comes at the cost of less power $P_D$ for the UL data transmission of all users in all cells, i.e. a decreased sum rate. On the other hand, a larger $P_D$ (η→1) leads to poor channel estimation due to having less pilot power available as well as more interference from the UL data transmission in other cells. A solution is to employ the optimum operating point (unequal power allocation) to reduce the pilot contamination.

The presented solution based on the time-shifted pilots with unequal power allocation between the pilot and UL data transmission phase is applicable for TDD and FDD systems. For an FDD system, a performance metric of the uplink for determining the optimum power allocation, e.g. the UL sum rate can be applied. For a TDD system, where the effect of pilot contamination is present in the uplink and downlink, a metric based on the performance in both links, e.g. the (weighted) sum of the UL and DL sum rates can be applied. In either case, the performance metric should be a function of the system parameters (e.g. number of neighboring cells, number of BS antennas, length of the pilot sequences, number of users, transmit power, channel variances, etc.) including the allocated power for the pilot transmission and for the UL data transmission of the users. To this end, previously computed (offline) look-up tables can be employed. In addition, closed-form expressions for instance for the UL sum rate and DL sum rate can also be used for determining the unequal power allocation.

From FIG. 2, it seems that the variance of the intercell interference is varying throughout the data phase for each cell 110, 120, 130, due to the fact that the cell in the pilot phase i.e. transmitting at a different power, is changing throughout the frame 211, 221, 231. However, the intercell interference experienced by the data transmission in a given cell actually consists of the sum of the interference from the adjacent cells. As shown in FIG. 2, there is always one cell which is interfering with the pilot transmission, which means that at each time there are N−2 cells interfering with UL data transmission and 1 cell interfering with pilot transmission. Hence, assuming a similar deployment in the adjacent cells 110, 120, 130, this implies that the variance of the sum of the interference resulting from all cells 110, 120, 130 does not change significantly. The interference coming from a cell switching to transmit the pilot may increase but this effect on the total experienced interference is cancelled out with the fact that another cell will be switching to transmit data with a lower power. In other words, for the cell receiving the interference it is transparent which cell is actually transmitting UL data or pilots.

Figure 3:
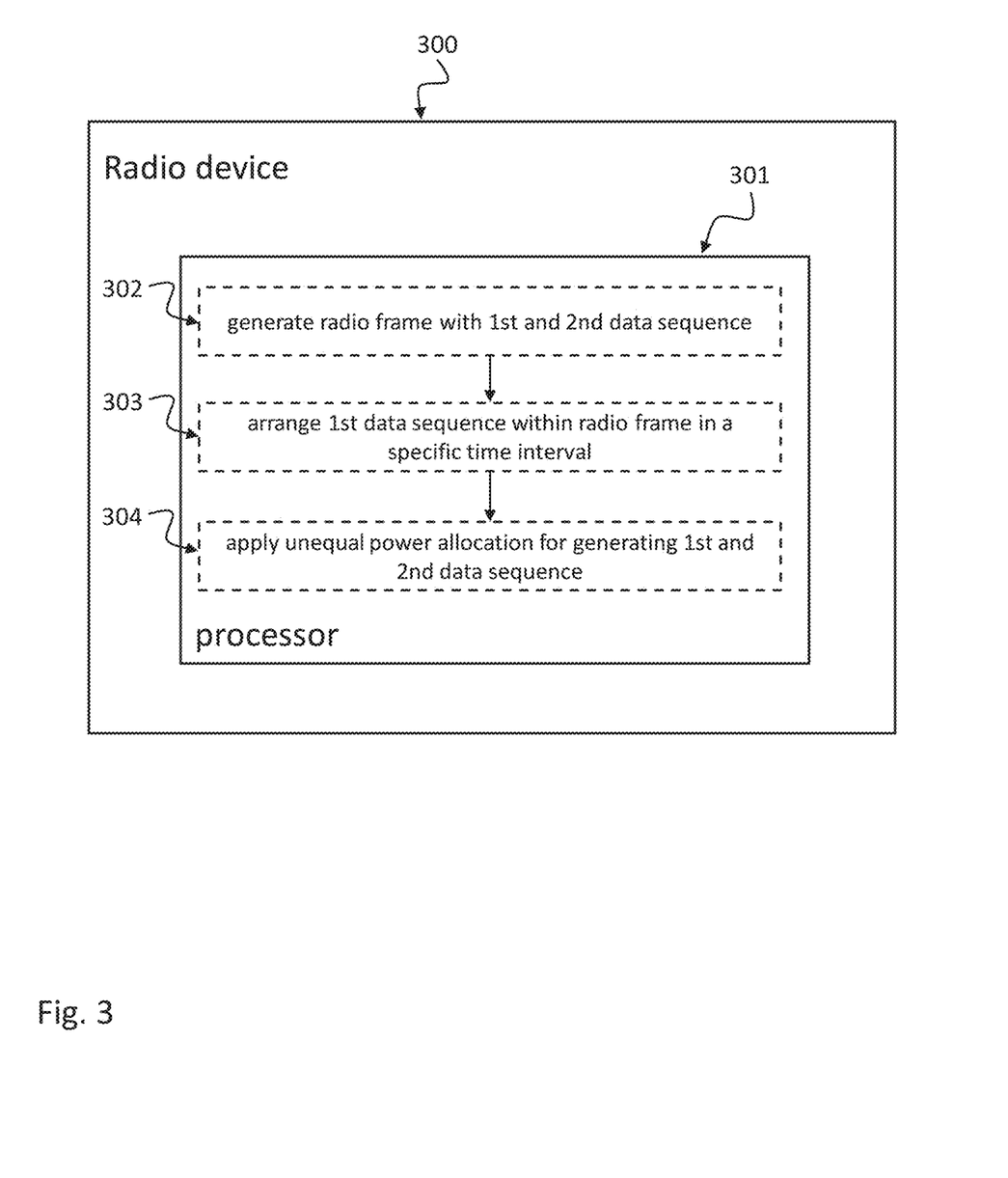
FIG. 3 shows a schematic diagram illustrating a radio device 300 according to an implementation form.

FIG. 3 shows a schematic diagram illustrating a radio device 300 according to an implementation form for communication with a radio cell. In one implementation, the radio device 300 can be a user equipment or a mobile device or a machine-type communication device. In another implementation, the radio device 300 can be a radio cell, e.g. a base station, a WiFi hot spot or a small cell. The radio device 300 includes a processor 301 and may include further electrical components, e.g. a radio transceiver, a power module, etc.

The processor 301 is configured to generate 302 a radio frame comprising a first data sequence and a second data sequence, e.g. a radio frame 211 comprising a known pilot data sequence 101a and an UL data sequence 102a as described above with respect to FIG. 2. The processor 301 is configured to arrange 303 the first data sequence 101a within the radio frame 211 in a time interval 212 that is non-overlapping with respect to a predetermined time interval 222, 232 of a first data sequence 101b, 101c of another radio device with another adjacent radio cell 120, 130, e.g. as described above with respect to FIG. 2. The processor 301 is further configured to apply 304 an unequal power allocation for generating the first data sequence 101a and the second data sequence 102a. The first data sequences 101b, 101c and their time intervals 222, 232 are known to the radio device, they may carry known pilot data or other known sequences, e.g. synchronization sequences or others.

In the implementation shown in FIG. 2 the first data sequence 101a of the radio device 300 and the first data sequence 101b, 101c of the other radio device may include pilot sequences, in particular orthogonal pilot sequences.

In one implementation form of the radio device, in which the radio device is an uplink device, i.e. a base station, the second data sequence 102a may be based on uplink data, and the radio frame 211 may further include a third data sequence 103 based on downlink data. In this implementation form (base station), the radio frame 211 includes a first phase 241 comprising the first data sequence 101a and the second data sequence 102a and a second phase 242 comprising the third data sequence 103. The first data sequence 101a of the radio device 300 may be time-shifted with respect to the first data sequence 101b, 101c of the other radio device in the first phase 241 of the radio frame 211.

The processor 301 may apply the unequal power allocation based on an average signal-to-interference and noise ratio (SINR) of the radio device 300 (either UE or BS). The processor 301 may apply the unequal power allocation based on a control signal received from the radio cell 110. The control signal may notify a power allocation update. The processor 301 may adjust a power for generating the first data sequence 101a and/or a power for generating the second data sequence 102a with respect to an overall transmission power constraint.

The processor 301 may adjust the power (energy) $P_T T_P$ for generating the first data sequence (101a) with respect to the power (energy) $P_D N T_P$ for generating the second data sequence (102a) according to the overall transmission power constraint $P(N+1)T_P$ as described above. Here, $P_T$ is the power for transmission of one symbol of the first data sequence 101a, $P_D$ is the power for transmission of one symbol of the second data sequence 102a, $T_P$ is the number of symbols of the first data sequence 101a, N is the number of adjacent radio cells 120, 130 and P is the average power of the radio device.

The processor 301 may adjust the power for generating the first data sequence 101a and/or the power for generating the second data sequence 102a according to a performance metric. The performance metric for generating a frequency division duplex (FDD) radio frame may be based on an optimality criterion with respect to an uplink transmission. The performance metric for generating a time division duplex (TDD) radio frame may be based on an optimality criterion with respect to an uplink transmission and/or a downlink transmission.

The performance metric may depend on a number of adjacent radio cells 110, 120, a length of the first data sequence 101a, a transmit power of the radio frame 211, a number of other radio devices communicating with the radio cell 110, and/or a channel quality of the other radio devices.

Figure 4:
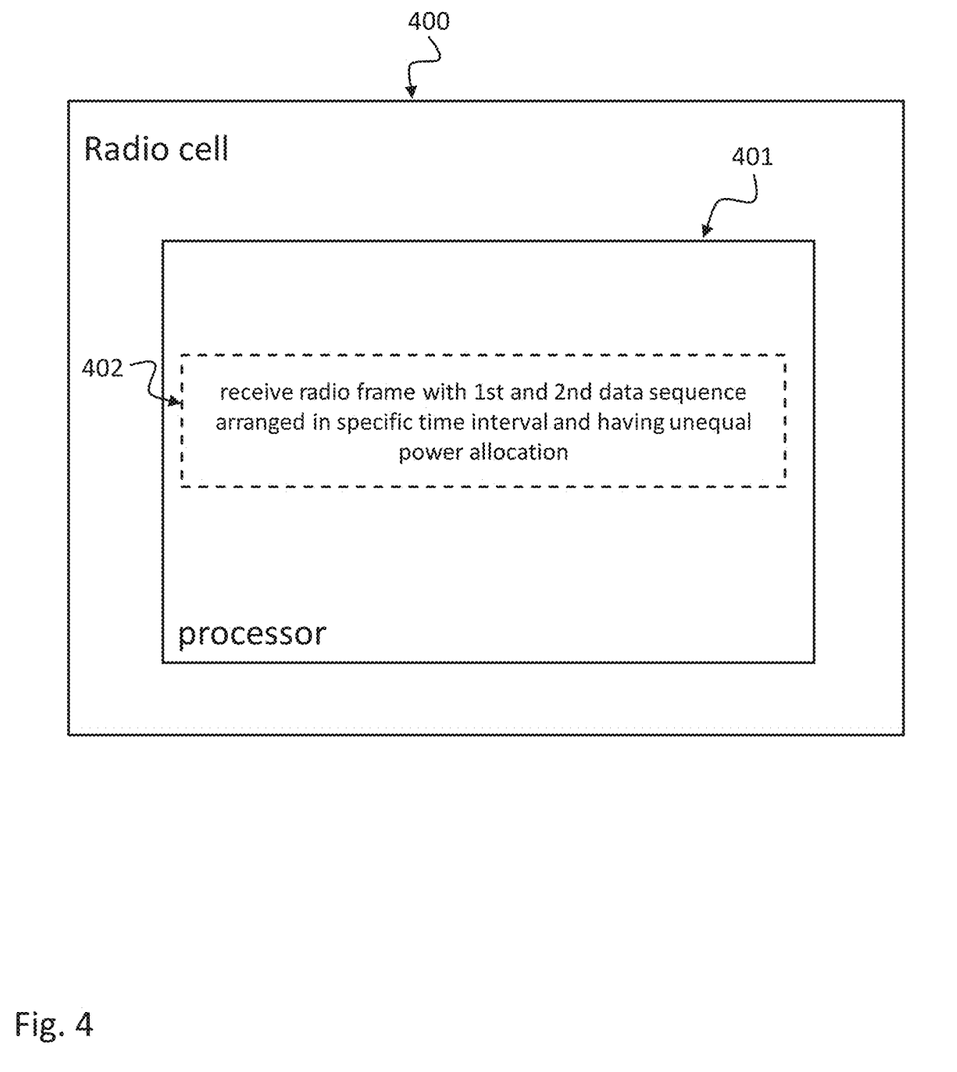
FIG. 4 shows a schematic diagram illustrating a radio cell 400 according to an implementation form.

FIG. 4 shows a schematic diagram illustrating a radio cell 400 according to an implementation form for communication with a radio device, e.g. a radio device 300 as described above with respect to FIG. 3. The radio cell may be implemented in a base station, a WiFi hotspot, a small cell, etc. or in a user equipment or mobile radio device. Both devices, i.e. radio cell 400 and radio device 300 may form a radio communication system. The radio cell 400 includes a processor 401 as shown in FIG. 4.

The processor 401 is configured to receive 402 a radio frame, e.g. a radio frame 211 as shown in FIG. 2 from the radio device 300. The radio frame 211 includes a first data sequence, e.g. a pilot sequence 101a as described above with respect to FIG. 2, and a second data sequence, e.g. an UL data sequence 102a as described above with respect to FIG. 2. The first data sequence 101a is arranged within the radio frame 211 in a time interval that is non-overlapping with respect to a predetermined time interval of a first data sequence of another radio device with another adjacent radio cell, e.g. a time interval 212 non-overlapping with respect to a predetermined time interval 222, 232 of a first data sequence 101b, 101c of another radio device with another adjacent radio cell 120, 130 as described above with respect to FIG. 2. The first data sequence 101a and the second data sequence 102a have an unequal power allocation.

The processor 401 may generate a control signal for transmission to the radio device 300. The control signal may indicate an adjustment for the power allocation of the first data sequence 101a and the second data sequence 102a. The processor 401 may generate the control signal based on a signal-to-noise and interference ratio (SINR) of the radio device 300, e.g. by measuring the SINR of the first data sequence 101a or the pilot sequence. The processor 401 may alternatively generate the control signal based on feedback from other radio devices communicating with the radio cell 110 and/or feedback from other radio cells 120, 130 of a plurality of adjacent radio cells.

Figure 5:
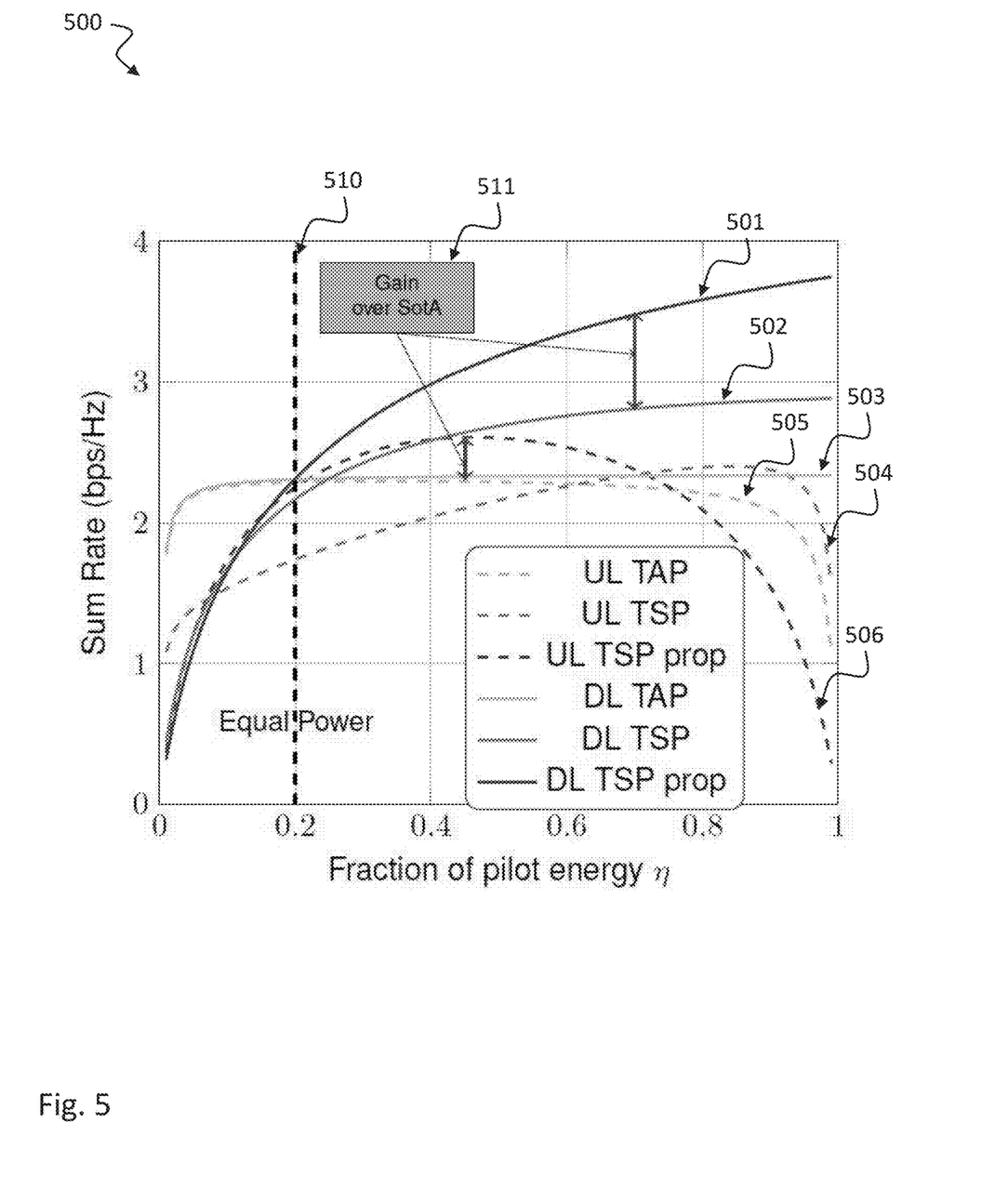
FIG. 5 shows a performance diagram 500 illustrating exemplary gain with unequal power allocation of a TDD system according to an implementation form.
Figure 6:
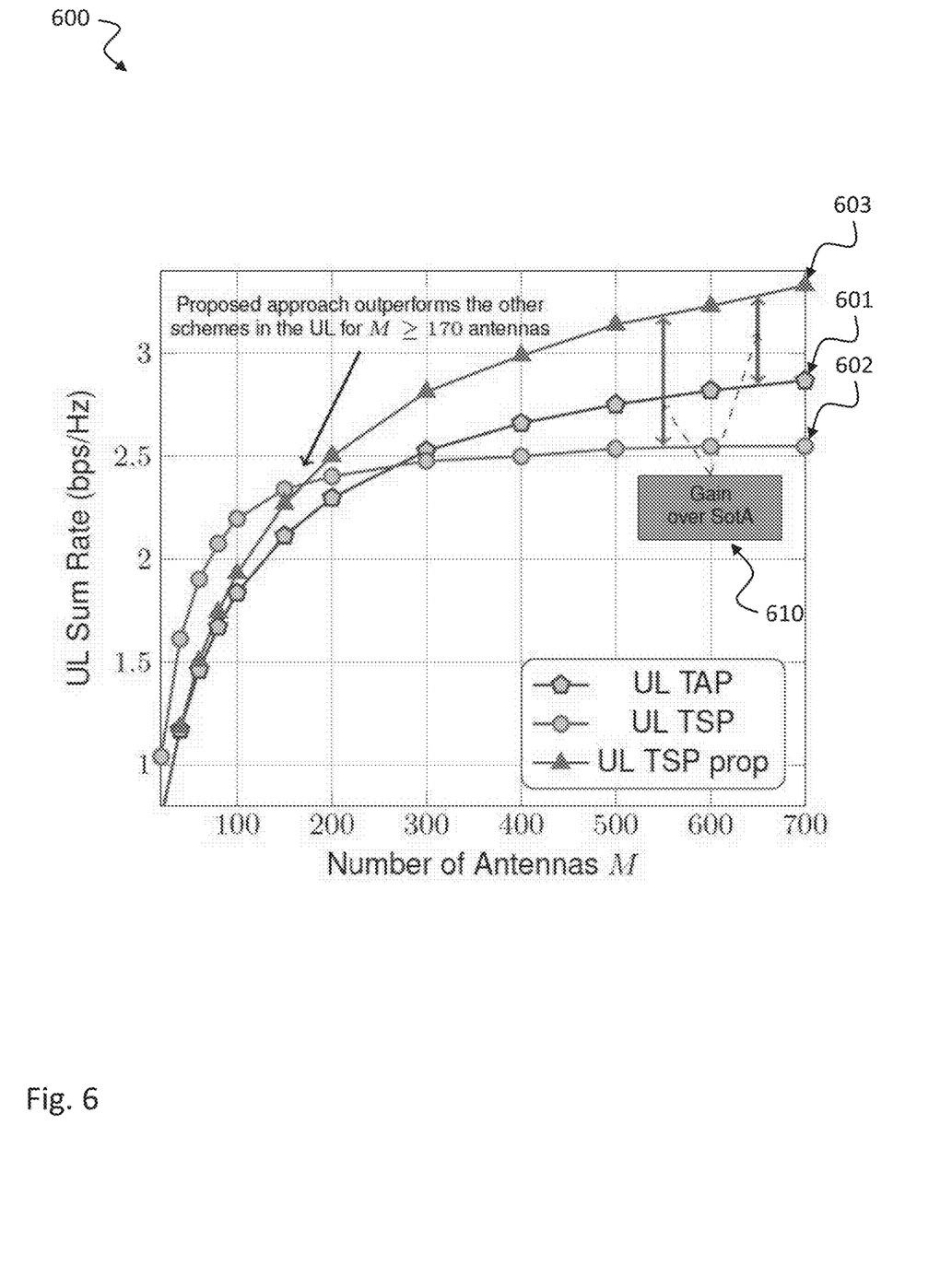
FIG. 6 shows a performance diagram 600 illustrating comparison in the uplink versus number of BS antennas for a TDD system according to an implementation form.
Figure 7:
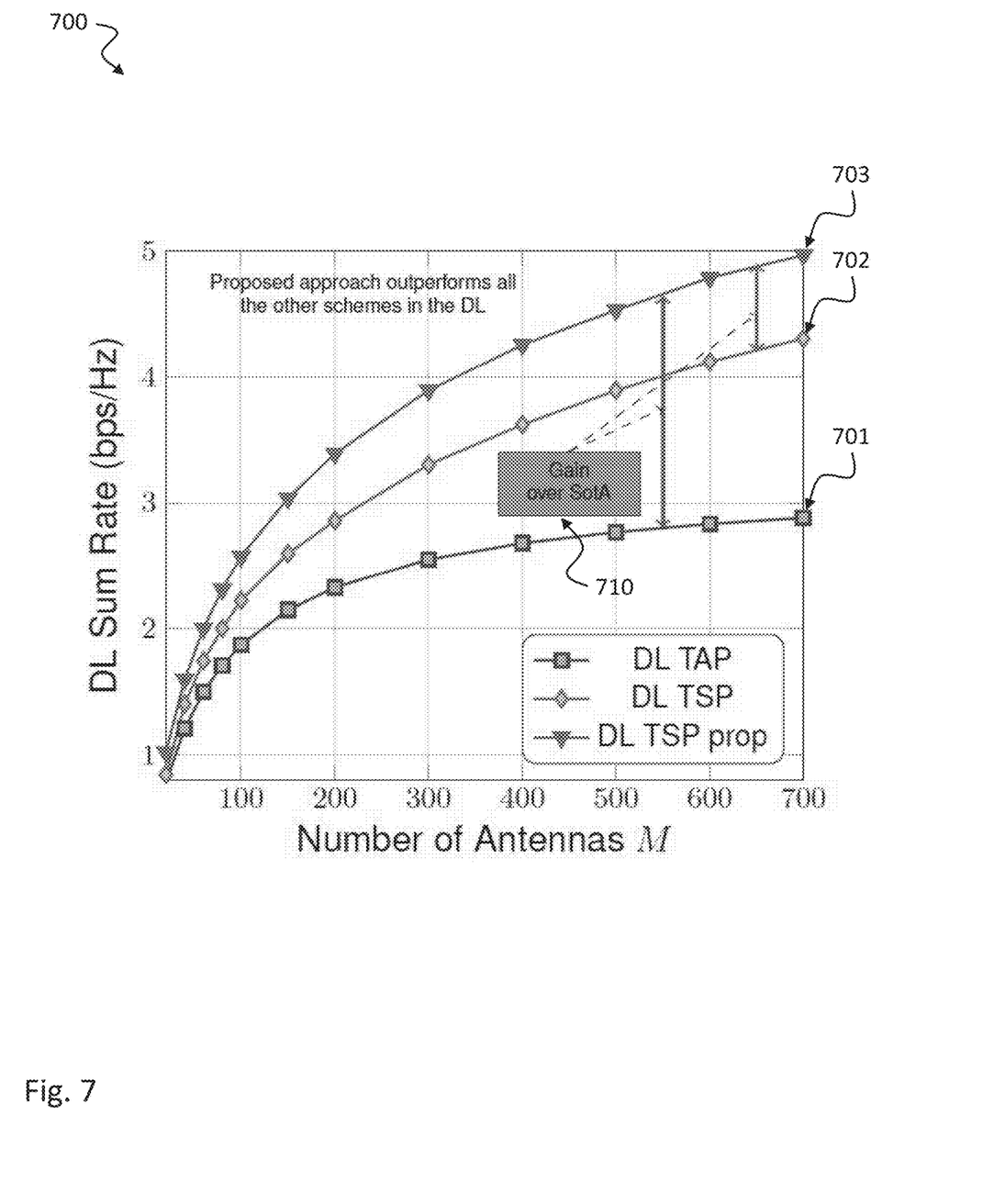
FIG. 7 shows a performance diagram 700 illustrating comparison in the downlink versus number of BS antennas for a TDD system according to an implementation form.

FIGS. 5, 6 and 7 show performance diagrams of a communication system including the above described radio device and radio cell. To evaluate the performance of the disclosed concept (referred to as "TSP prop" in the following FIGS. 5, 6 and 7), a TDD system is evaluated with N=4 cells, M=200 antennas at the BS (uniform linear array), K=10 users per cell (each user equipped with a single antenna), length of UL pilots $T_P$=10 symbols, uplink SNR=0 dB (same transmit power for all users), downlink SNR=10 dB. The sum of the achievable rates (based on $\log_2(1+$SINR)) in the UL and DL of the users in a cell is considered for the figure of merit. Maximum ratio combining and maximum ratio transmission is performed in the uplink and downlink, respectively, based on the users' channels estimated in the uplink. Rayleigh fading is applied with variance equal to 1 for the channels from a BS to its users, equal to 0.2 from a BS to the users in other cells, and equal to 0.1 for the channels between users in different cells. The effective downlink channels are assumed to be perfectly known for all schemes. The training overhead is the same for all schemes, i.e., can be ignored for comparison.

For the (prior art) time-shifted pilots multiplexed with DL data, which requires the knowledge of the LOS channels to the other BSs (for mitigating BS-BS interference), a zero mean Gaussian error is assumed such that 95% of the estimated angles of departure (AoD) lie within +/−2.8 degrees from the true AoDs of the LOS channels. Rice fading with K-factor=10 and variance equal to 0.2 for the BS-BS channels is also assumed. For the time-aligned pilots and time-shifted pilots multiplexed with DL data (referred in the following figures as "TAP" and "TSP", respectively), also optimum power allocation between the pilot and the UL data transmission phases is considered, such that the sum of the UL and DL rates is maximized. Note this corresponds actually to an improved version of the state of art.

FIG. 5 shows a performance diagram 500 illustrating exemplary gain with unequal power allocation of a TDD system according to an implementation form.

To observe the performance gain of the disclosed concept even with the improved state of art, FIG. 5 depicts the rates of one cell (UL and DL sum rates) as a function of the fraction of pilot energy η, i.e. as a function of the power allocated to the pilot and UL data transmission. The actual state of art assumes equal power allocation between the pilot and UL data transmission (i.e. $P=P_T=P_D$), which correspond to the points achieved with $\eta=1/(N+1)=0.2$ for the considered scenario. With unequal power allocation between the UL data transmission and the pilot phase, the disclosed scheme is able to provide an increased performance for both the uplink and the downlink sum rates. The previously discussed tradeoff in selecting the optimum power allocation is clearly visible, in particular for the UL sum rate. In fact, a maximum gain of 16% can be achieved in the UL sum rate with the disclosed scheme (UL TSP prop 506) for the optimum power allocation corresponding to η=0.45. By varying η over the range between 0.2 and 0.75 for the UL sum rate, the disclosed idea is able to outperform the time-aligned pilots with equal power allocation between the phases. Despite the fact that the optimum is achieved with η=0.45 for the UL sum rate, there is a wide range of unequal power allocations for which the disclosed scheme is able to achieve a performance gain. In addition, changing the power allocation does not lead to any performance improvement for the case of time-aligned pilots (UL TAP and DL TAP).

From FIG. 5 it can be observed that the best operating point for the uplink is distinct than for the downlink, where the DL sum rate is maximized by allocating all the power for the pilot transmission, i.e. η=1. As discussed before for a TDD system, it can be seen that the best operating point is given by the power allocation which maximizes the sum of the UL sum rate and the DL sum rate.

In the following, the power allocation for the pilot phase and UL data transmission given by this operating point for the disclosed approach (TSP prop 603, 703) is considered as well as the state of the art (SotA) approaches (TAP 601, 701 and TSP 602, 702).

FIG. 6 shows a performance diagram 600 illustrating comparison in the uplink versus number of BS antennas and FIG. 7 shows a performance diagram 700 illustrating comparison in the downlink versus number of BS antennas. FIG. 6 and FIG. 7 depict the achieved performance when operating with the optimum power allocation as a function of the number of antennas for the uplink and downlink, respectively. It can clearly be seen that the disclosed approach 603 outperforms the improved SotA in the uplink (FIG. 6) for M>170 antennas, whereas for the downlink (FIG. 7) the disclosed approach 703 outperforms the improved SotA for all the range of the number of antennas. When considering the sum of both rates as a figure of merit, the disclosed scheme outperforms the other schemes for M>80 antennas.

In the previous discussion, the same transmit power among the users was considered or equivalently that the variance for the channels of the users in a cell are the same and in addition, an equal variance for the interfering channels, i.e. for the channels between the users in a cell to the BSs in the other (adjacent) cells. In practice, however, this assumption might not exactly hold. In terms of analysis, the advantage and the offered gain of the disclosed approach would not change when considering different variances for the channels in a cell and different variances for the interfering channels. In such a case, the power allocation between the UL data and the pilot transmission can be assumed fixed and optimized for all users, in order to reduce the interference on the channel estimation (pilot contamination) and thus, obtain a performance improvement with the disclosed idea. However, allowing for different power allocations among the users would lead to a better performance. In fact, the optimum power allocation could be performed per user and additionally possibly considering a coordinated pilot to user assignment between the adjacent cells. However, to ease the complexity of such an approach and decrease the information exchange/overhead between cells, the following scheme can be employed to reduce the pilot contamination with the disclosed idea.

Figure 8:
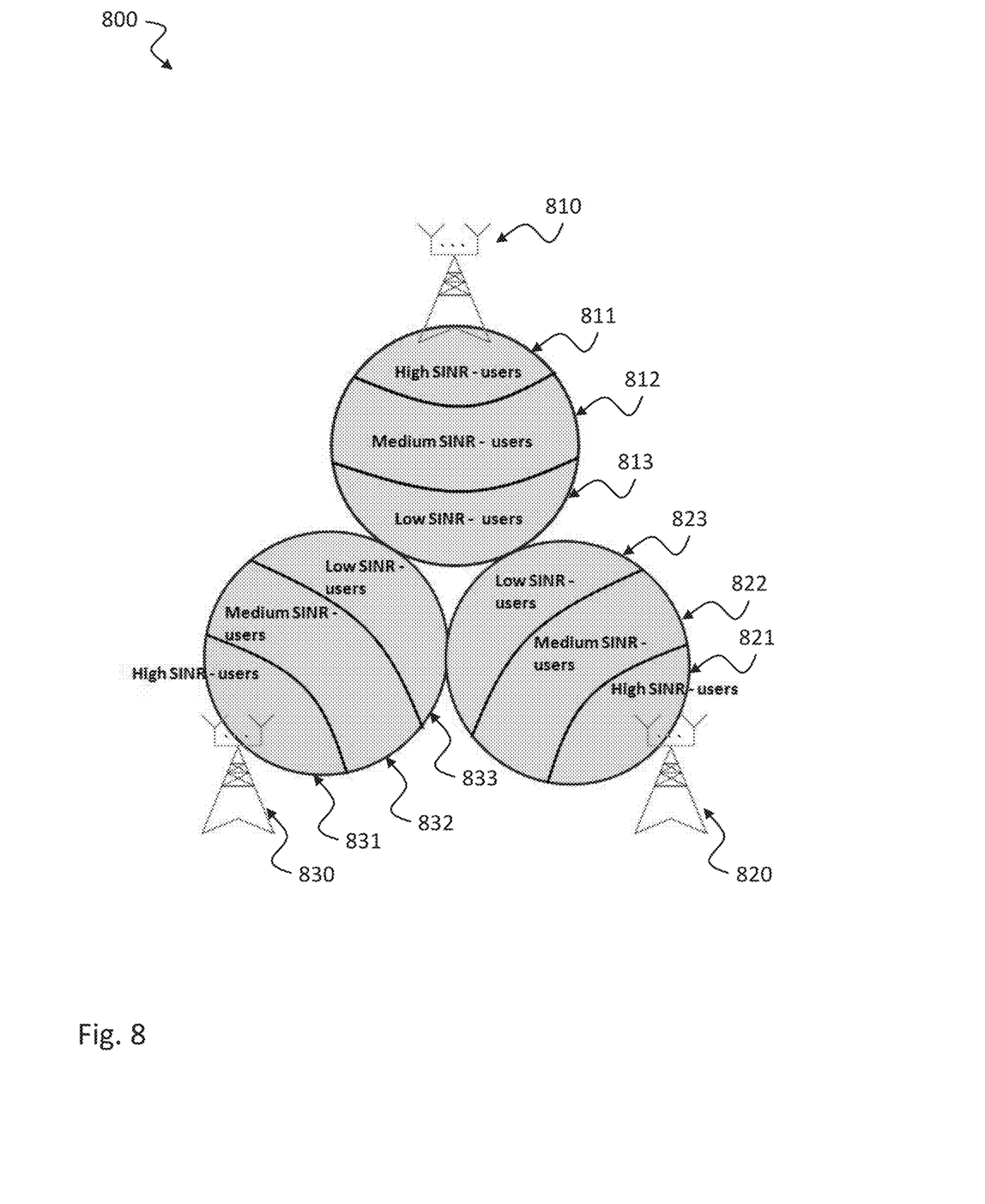
FIG. 8 shows a schematic diagram of an exemplary classification of users with different average SINR in neighboring/adjacent radio cells.

To this end, the scenario of three adjacent cells 810, 820, 830 depicted in FIG. 8 can be considered. To handle the case of users with different transmit powers/channel variance, users can be grouped into different groups according to their average SINR: for instance, low SINR users 813, 823, 833, medium SINR users 812, 822, 832 and high SINR users 811, 821, 831 (in some cases these groups can correspond to the so-called far users, medium users and near users) as depicted in FIG. 8. For the channel estimation of users which have high average SINR, the effect of pilot contamination is smaller than for users which have a low average SINR. Furthermore, the transmission of high SINR users in the uplink results in possibly less interference to the adjacent BS in contrast to the transmission of low SINR users (cell edge users). Thus, a different power allocation can be applied between the pilot phase and the data transmission for each group of users.

In the following a concept is shown how the power allocation for each group can be determined. Without loss of generality, the sum rate for each group of users can be considered as a figure of merit (i.e. the UL sum rate per group for an FDD systems or the sum of the UL and DL sum rate per group of users for a TDD system), to obtain the optimum power allocation for each group of users. In addition, it can be assumed that the sum rate for a group of users is only interfered by the same group of user in other cells. Note that this will not be necessarily the case in practice, since no coordinated pilot to user assignment between the cells is assumed. When considering for example the medium SINR users 812 in a given cell 810; if the interference on these users results from the high SINR users 821, 831 in the adjacent cells 820, 830, then the interference can be smaller as if the interference would result from the low SINR users 823, 833 in the adjacent cells 820, 830, which are closer to the other BSs as shown in FIG. 8.

However, by decoupling the problem in this way, multiple independent objective functions can be obtained, such that one can proceed to optimize the optimum power allocation for each group of users. To this end, the optimum power allocation for each group of users can be obtained by considering a smaller number of users, namely those in each SINR group. The optimum power allocation for each group of users can be exchanged between the adjacent cells, in order to consider it for the optimization at each BS. Otherwise, the optimization can be performed at each BS in a distributed manner by assuming a given (average) deployment in the adjacent cells including the variance of the interfering channels from each group of users in the adjacent cells (which can be communicated/obtained offline). In addition, note that the disclosed idea can also be combined with power control.

Figure 9:
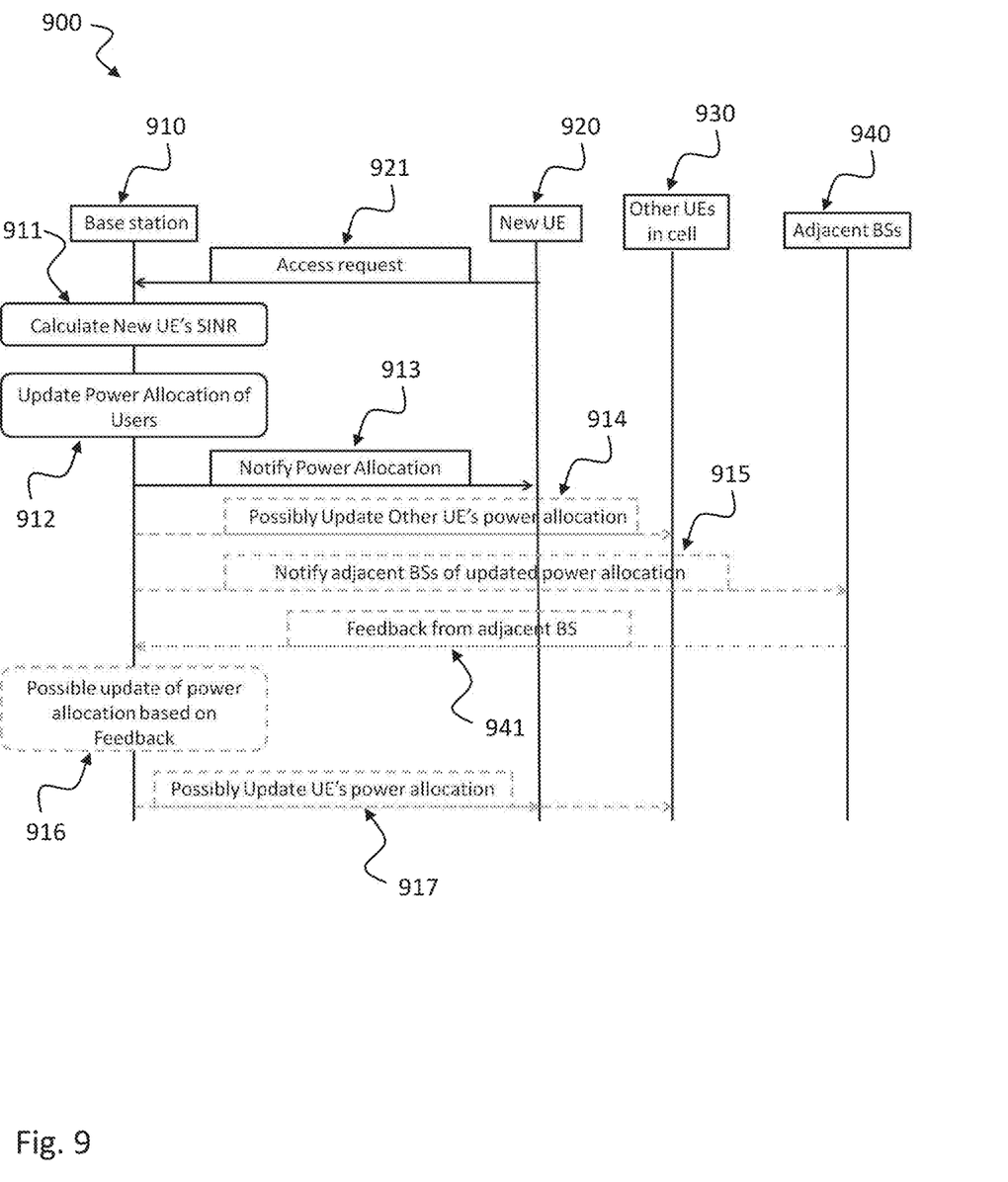
FIG. 9 shows a schematic diagram illustrating a signaling procedure for updating power allocation with new users according to an implementation form.

FIG. 9 shows a schematic diagram illustrating a signaling procedure for updating power allocation with new users according to an implementation form.

The unequal power allocation which leads to a performance increase with the disclosed approach depends on several parameters which can change in the network, such as the number of interfering BSs, length of the pilot sequences, transmit power, number of users, channel quality of the users and interfering channels (SINR of the users). To this end, the power allocation needs to be calculated after events involving a change of such parameters and signalled to the users as possibly also to the neighbouring BSs. For example, in FIG. 9, the signalling procedure 900 for the triggering event 921 involving a new user 920 is depicted. When a new user 920 is considered, the BS 910 needs first to determine its average SINR 911, based on which the power allocation of the new user 920 is determined 912. Afterwards, the BS 910 can communicate an eventual update of the power allocation 914 of the other users in the cell 930, as well as the new power allocation 915 to the adjacent BSs 940. In this case, the adjacent BSs 940 may need to update the power allocation of their users and inform 917 the original BS 910 of such an update. In case of a new power allocation in the adjacent BSs 940, the users in these cells need to be informed. The original BS 910 may also require to update the power allocation to its user based on the feedback information 941 and in turn inform its users. In case of other triggering events such as turning on or off of neighbouring BSs or changes in the pilot length, the power allocation needs to be updated accordingly in a similar way.

The present disclosure also supports a method for processing a radio frame, in particular by a radio device, e.g. a user equipment. The method includes: generating a radio frame comprising a first data sequence and a second data sequence; arranging the first data sequence within the radio frame in a time interval that is non-overlapping with respect to a predetermined time interval of a first data sequence of another radio device with another adjacent radio cell; and applying an unequal power allocation for generating the first data sequence and the second data sequence.

The present disclosure also supports a method for processing a radio frame, in particular by a radio cell, e.g. a base station. The method includes: receiving a radio frame, wherein the radio frame comprises a first data sequence and a second data sequence, wherein the first data sequence is arranged within the radio frame in a time interval that is non-overlapping with respect to a predetermined time interval of a first data sequence of another radio device with another adjacent radio cell, and wherein the first data sequence and the second data sequence have an unequal power allocation.

The present disclosure also supports a computer program product including computer executable code or computer executable instructions that, when executed, causes at least one computer to execute the performing and computing steps described herein, in particular the steps of the methods described above. Such a computer program product may include a readable non-transitory storage medium storing program code thereon for use by a computer. The program code may perform the performing and computing steps described herein, in particular the methods described above.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present embodiments of the invention has been described with reference to one or more particular embodiments, those skilled in the art recognize that many changes may be made thereto without departing from the scope of the present embodiments of the invention. It is therefore to be understood that within the scope of the appended claims and their equivalents, the present embodiments of the invention may be practiced otherwise than as specifically described herein.

What is claimed is:

1. A user equipment, comprising:
    a processor; and
    a non-transitory memory storing instructions, that when executed by the processor, causes the user equipment to—
    perform steps comprising:
        generating a radio frame comprising a first data sequence and a second data sequence,
        arranging the first data sequence within the radio frame in a time interval that is non-overlapping with respect to a predetermined time interval of a first data sequence of another radio device with another adjacent radio cell, and applying an unequal power allocation for generating the first data sequence and the second data sequence by adjusting at least one of a power for generating the first data sequence and a power for generating the second data sequence with respect to an overall transmission power constraint and adjusting the power or energy $P_T T_P$ for generating the first data sequence with respect to the power or energy $P_D N T_P$ for generating the second data sequence according to the overall transmission power constraint $P(N+1)T_P$, wherein $P_T$ is the power for transmission of one symbol of the first data sequence, $P_D$ is the power for transmission of one symbol of the second data sequence, $T_P$ is the number of symbols of the first data sequence, N is the number of adjacent radio cells and P is a reference power and the radio frame comprises a first phase comprising the first data sequence and the second data sequence and a second phase comprising the third data sequence, and the first data sequence of the radio device is time-shifted with respect to the first data sequence of the other radio device in the first phase of the radio frame.

2. The user equipment of claim 1,
wherein the first data sequence of the radio device and the first data sequence of the other radio device comprise pilot sequences, in particular orthogonal pilot sequences.

3. The user equipment of claim 1,
wherein the second data sequence is based on uplink data, and
the radio frame further comprises a third data sequence based on downlink data.

4. The user equipment of claim 1,
wherein the steps further comprise applying the unequal power allocation based on an average signal-to-interference and noise ratio (SINR) of the radio device.

5. The user equipment of claim 1,
wherein the steps further comprise applying the unequal power allocation based on a control signal received from the radio cell, the control signal notifying a power allocation update.

6. The user equipment of claim 1,
wherein the steps further comprise adjusting the power for generating the first data sequence and/or the power for generating the second data sequence according to a performance metric.

7. The user equipment of claim 6,
wherein the performance metric for generating a frequency division duplex (FDD) radio frame is based on an optimality criterion with respect to an uplink transmission, and
the performance metric for generating a time division duplex (TDD) radio frame is based on an optimality criterion with respect to an uplink transmission and/or a downlink transmission.

8. The user equipment of claim 6, wherein the performance metric depends on at least one of the following system parameters:
a number of adjacent radio cells,
a length of the first data sequence,
a transmit power of the radio frame,
a number of other radio devices communicating with the radio cell, and
a channel quality of the other radio devices.

* * * * *